(12) United States Patent
McKown

(10) Patent No.: US 8,279,988 B2
(45) Date of Patent: Oct. 2, 2012

(54) EFFICIENT CHANNEL ESTIMATE BASED TIMING RECOVERY

(75) Inventor: Russell McKown, Richardson, TX (US)

(73) Assignee: Advanced Receiver Technologies, LLC, Dallas, TX (US)

( * ) Notice: Subject to any disclaimer, the term of this patent is extended or adjusted under 35 U.S.C. 154(b) by 628 days.

(21) Appl. No.: 11/900,343

(22) Filed: Sep. 11, 2007

(65) Prior Publication Data

US 2009/0147895 A1    Jun. 11, 2009

(51) Int. Cl.
*H04L 7/00* (2006.01)
(52) U.S. Cl. .................................. 375/355; 375/326
(58) Field of Classification Search .................. 375/316, 375/326, 327, 339, 340, 344, 345, 355
See application file for complete search history.

(56) References Cited

U.S. PATENT DOCUMENTS

| | | | |
|---|---|---|---|
| 5,285,482 A * | 2/1994 | Sehier et al. ................. | 375/355 |
| 5,734,598 A * | 3/1998 | Abbott et al. ................. | 708/322 |
| 5,812,336 A * | 9/1998 | Spurbeck et al. ............. | 360/51 |
| 6,446,236 B1 * | 9/2002 | McEwen et al. ............. | 714/795 |
| 6,545,532 B1 * | 4/2003 | Maalej et al. ................ | 329/304 |
| 2003/0174786 A1 * | 9/2003 | Chiu et al. .................... | 375/316 |
| 2004/0090981 A1 * | 5/2004 | Lin et al. ...................... | 370/445 |
| 2004/0150753 A1 * | 8/2004 | Jun ................................ | 348/607 |
| 2009/0129450 A1 * | 5/2009 | Eum et al. .................... | 375/214 |
| 2009/0190643 A1 * | 7/2009 | Kim .............................. | 375/226 |

* cited by examiner

*Primary Examiner* — Emmanuel Bayard

(57) ABSTRACT

A module and method for channel estimate based timing recovery comprises a timing estimation module, a channel estimation module communicably coupled to the timing estimation module, a conversion module communicably coupled to the timing estimation module and to the channel estimation module, and an analog pulse shaping filter communicably coupled to the conversion module, wherein: the analog pulse shaping filter receives an analog signal and outputs a filtered analog signal, the conversion module receives the filtered analog signal and outputs a 1/T rate signal to the channel estimation module, the channel estimation module outputs a 1/T Channel Impulse Response (CIR) estimate to the timing estimation module, and the timing estimation module outputs a timing estimate to the conversion module, wherein the timing estimate is used in conjunction with an output of the conversion module to provide the 1/T rate signal.

20 Claims, 9 Drawing Sheets

EFFICIENT CHANNEL ESTIMATE BASED TIMING RECOVERY

CROSS-REFERENCE TO RELATED APPLICATIONS

The present patent application is related to U.S. Provisional Patent Application 60/628,248 filed on Nov. 16, 2004, entitled Chip-Level No-Decision Feedback Equalizer For CDMA Wireless Systems, U.S. patent application Ser. No. 11/280,858 filed on Nov. 16, 2005, entitled Chip-Level No-Decision Feedback Equalizer For CDMA Wireless Systems, and U.S. patent application Ser. No. 10/796,596 filed on Mar. 9, 2004, entitled Methods and Apparatus For Single Burst Equalization of Single Carrier Signals In Broadband Wireless Access Systems, the contents of each of which are incorporated by reference herein.

BACKGROUND OF INVENTION

In current telecommunication systems, digital information of interest is typically communicated from a transmitter at one location to a receiver at another location by first forming a sequence of symbols based on the digital information and then using the symbol sequence to modulate a single carrier signal or a multiple carrier signal. At the receiver, the carrier signal is removed and the resultant, so called, 'baseband' signal is processed to recover first the symbols and then the digital information of interest. In general, signals used to communicate digital information from a transmitter to a receiver can be referred to as digital communication signals. Although the details of the mapping of the digital information onto the symbols vary from one application to another as do the details of the signal modulation, it is standard practice in the design of digital communication signals to use a fixed symbol rate (or a well defined set of fixed symbol rates) such that the individual symbols are used to modulate the signal for a fixed interval of time. The inverse of this individual symbol time interval is referred to as the symbol rate.

It is also standard practice in the design of digital communication signals to place what is referred to as a pulse shaping filter in the transmitter-to-receiver channel response or equivalently, the transmitter-to-receiver transfer function. The pulse shaping filter imposes a shape to the individual symbol 'pulses' so as to minimize the interference between the symbol pulses at the communications signal receiver. By far the most common example of a pulse shaping filter is the raised cosine filter (RCF). Typically the RCF is distributed between the transmitter and the receiver such that a root raised cosine filter (RRCF) is at both the transmitter and the receiver, the net contribution to the transmitter-to-receiver channel response being equivalent to one RCF.

It is also standard practice in the design of digital communication signals to impose a framing structure on the sequence of symbols that is used to modulate the single carrier or multiple carrier signal. Once the framing structure is properly identified it is an aid to the communications signal receiver in that it simplifies the process of extracting the digital information of interest. An example of such a framing structure is the 'slot' structure in the Wideband Code Division Multiple Access (WCDMA) signal specified by the Third Generation Partnership Project (3GPP) standards organization. The WCDMA slot consists of 10 sub-frames of 256 chips each, the symbols being related to the chips by a spread code. For the WCDMA signal and code division multiple access signals in general, the fundamental timing interval is the chip rate whereas the symbol rates are well defined multiples of the chip rate.

Symbol (chip) timing recovery refers to the process in the communications signal receiver that estimates the time when the information and/or energy associated with individual symbols (chips) arrives in the received communications signal. Since the transmitter typically clocks the symbol (chip) interval based on a crystal oscillator, in order to be accurate the timing recovery process at the receiver must be capable of dynamically tracking changes in the fundamental timing interval that are due to variations in the transmitter's crystal oscillator frequency.

Frame timing recovery refers to the process in the communications signal receiver that estimates when the start and stop of each frame or sub-frame occurs in the received communications signal.

If the communications signal receiver is battery operated it is desirable to process the communications signal at a low sample rate in order to reduce the computations per symbol (digital information of interest). Fewer computations per symbol result in lower power consumption by the receiver and extend the battery life. This is especially desirable for today's mobile broadband communication devices, examples being third generation (3G) mobile phones and battery operated computers with embedded wireless broadband network interfaces.

Symbol timing recovery for the above described digital communications signals is an important function. However, traditional timing recovery schemes require an over-sampling of the communications signal, e.g., a sampling at a rate of 2/T or 4/T, resulting in various inefficiencies. As such, what is needed is a system and method that overcomes this limitation.

SUMMARY OF INVENTION

The present invention provides a system (or module) and method of an efficient channel estimate based timing recovery for digital communications signals when the signal is sampled at a minimum rate of one sample per fundamental timing interval (i.e., at a 1/T sample rate). The present invention also provides an efficient frame timing recovery for digital communication signals.

In one embodiment of the present invention, a module comprises a timing estimation module, a channel estimation module communicably coupled to the timing estimation module, a conversion module communicably coupled to the timing estimation module and to the channel estimation module, and an analog pulse shaping filter communicably coupled to the conversion module, wherein: the analog pulse shaping filter receives an analog signal and outputs a filtered analog signal, the conversion module receives the filtered analog signal and outputs a 1/T rate signal to the channel estimation module, the channel estimation module outputs a 1/T Channel Impulse Response (CIR) estimate to the timing estimation module, and the timing estimation module outputs a timing estimate to the conversion module, wherein the timing estimate is used in conjunction with an output of the conversion module to provide the 1/T rate signal.

In another embodiment of the present invention, a module comprises an interpolation filter, a timing estimation module communicably coupled to the interpolation filter, and a channel estimation module communicably coupled to the interpolation filter, and to the timing estimation module, wherein: the interpolation filter receives a digital signal and outputs a 1/T rate signal to the channel estimation module, the channel estimation module outputs a 1/T Channel Impulse Response (CIR) estimate to the timing estimation module, and the timing estimation module outputs a timing estimate to the interpolation filter, wherein the timing estimate is used in conjunction with the digital signal to provide the 1/T rate signal.

In a further embodiment of the present invention, a module comprises an interpolation filter, a module communicably coupled to the interpolation filter, a timing estimation module communicably coupled to the interpolation filter, and a channel estimation module communicably coupled to the module, to the interpolation filter, and to the timing estimation module, wherein: the interpolation filter receives a digital signal and outputs a one sample per baud interval (1/T) rate signal to the module and to the channel estimation module, the channel estimation module outputs a Channel Impulse Response (CIR) estimate to the timing estimation module, and the timing estimation module outputs a timing estimate to the interpolation filter.

In yet another embodiment of the present invention, a method for determining a timing estimate comprises receiving a 1/T sampled channel waveform estimate, interpolating the 1/T sampled channel waveform estimate to an N/T sampled channel waveform estimate, determining an absolute value waveform based on the interpolating, and determining a timing estimate based on the absolute value waveform.

DETAILED DESCRIPTION OF THE INVENTION

The present invention provides a system (or module) and method of an efficient channel estimate based timing recovery for digital communications signals when the signal is sampled at a minimum rate of one sample per fundamental timing interval (i.e., at a 1/T sample rate). The present invention can be utilized with any wireless signal that utilizes a fixed timing interval which includes Code Division Multiple Access (CDMA), Orthogonal Frequency Division Multiple Access (OFDMA), and Orthogonal Frequency Division Multiplexing (OFDM).

For a transmitter-to-receiver channel that includes a pulse shaping filter for a pulse interval T equal to the fundamental timing interval, timing recovery is accomplished with a signal that is sampled at the minimum rate of one sample per fundamental timing interval (i.e., a 1/T sample rate). The timing estimate is obtained by producing a minimal resolution channel estimate waveform from the 1/T sample rate signal wherein the resolution of the channel estimate waveform is one time-lag sample per fundamental timing interval and applying a timing estimation procedure to the minimal resolution channel estimate waveform.

Figure 1:
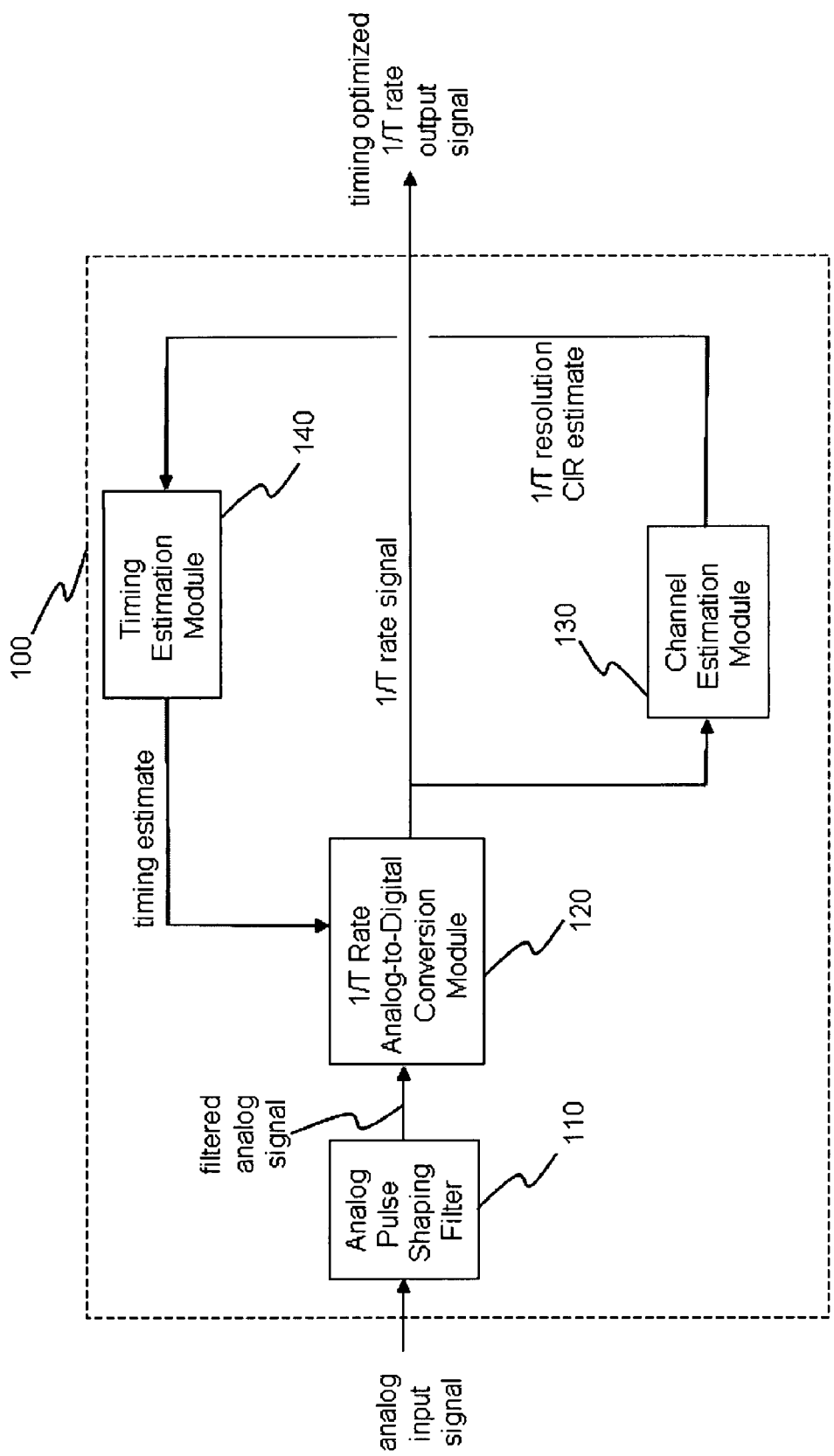
FIG. 1 depicts a first block diagram of a channel estimate based timing recovery system in accordance to an embodiment of the present invention.

FIG. 1 shows a block diagram of certain processes performed by an implementation of the minimum sample rate, channel estimate based timing recovery system 100 of the present invention. In the process configuration of FIG. 1, an analog pulse shaping filter 110 receives the analog input signal and outputs a filtered analog signal that is received by the minimum 1/T rate analog-to-digital conversion module 120.

For example, the analog input signal in FIG. 1 can represent a baseband signal associated with the WCDMA downlink in which case it represents, equivalently, either one complex signal or two real signals representing the in-phase and quadrature components of the analog baseband signal that is output from a radio frequency (RF) analog signal down converter such as exists in a cell phone handset. In this example the 1/T sample rate is equal to the WCDMA chip rate and the analog pulse shaping filter 110 is a RRCF. Since the WCDMA transmitter has a matching RRCF pulse shaping filter, the transmitter-to-receiver channel includes a net RCF pulse shaping filter equal to the product of two RRCF pulse shaping filters.

The pulse shaping filter can be described as belonging to the set of filters that tend to minimize the interference between the symbol pulses in the output of the filter. For example, for baseband signals the pulse shaping filter is a low pass filter with a cutoff frequency of approximately ½T.

Referring to FIG. 1, the minimum 1/T rate analog-to-digital conversion module 120 also receives the timing estimate from the timing estimation module 140. The timing estimate is used to adjust the timing phase of the analog-to-digital conversion process. For example, if the signal input to the analog-to-digital conversion module 120 is y(t) where t is continuous time, the 1/T rate sampled output of the module 120 can be represented as y(n*T+α) where α is the timing phase such that 0<=<=T. In the case where T is perfectly known, the timing estimate can adjust the timing by simply adjusting α. In the more general case where T is not perfectly known, a sequence of timing estimates in effect adjusts both T and α in order to provide an optimally sampled 1/T rate signal.

The timing estimation module receives the minimum 1/T resolution channel impulse response (CIR) estimate waveform from the channel estimation module 130. For the example, this CIR estimate waveform can be notated as a set of complex (or real) numbers, $\hat{h}(\tau)$, at discrete time lags $\tau=n*T$ for $n=0, 1, 2, \ldots N_{CIR}$, where T is the fundamental timing interval and the discrete time lags are such that the actual channel impulse response, $h(\tau)$, is known to be zero for n outside of the interval n=0 to $N_{CIR}$. The channel estimation module 130 receives the 1/T sample rate signal from the 1/T rate analog-to-digital conversion module 120 and processes it as described below to determine the 1/T resolution CIR estimate, $\hat{h}(\tau)$.

The minimum sample rate, channel estimate based timing recovery system 100 of FIG. 1 outputs a timing optimized 1/T rate signal from the analog-to-digital conversion module 120 that can be processed further as is appropriate for specific applications. For example, if the analog signal input is the baseband WCDMA downlink signal, the optimized 1/T rate output signal can be efficiently processed to provide symbol estimates to a decoder unit in a cellphone handset. The decoder and subsequent processing units in the cellphone or other electronic device can then process the information in the symbol estimates to provide the subscriber, for example, a visual display showing a text message, e-mail or video clip; and/or audible sounds representing a voice phone call, video soundtrack or music clip.

Figure 2:
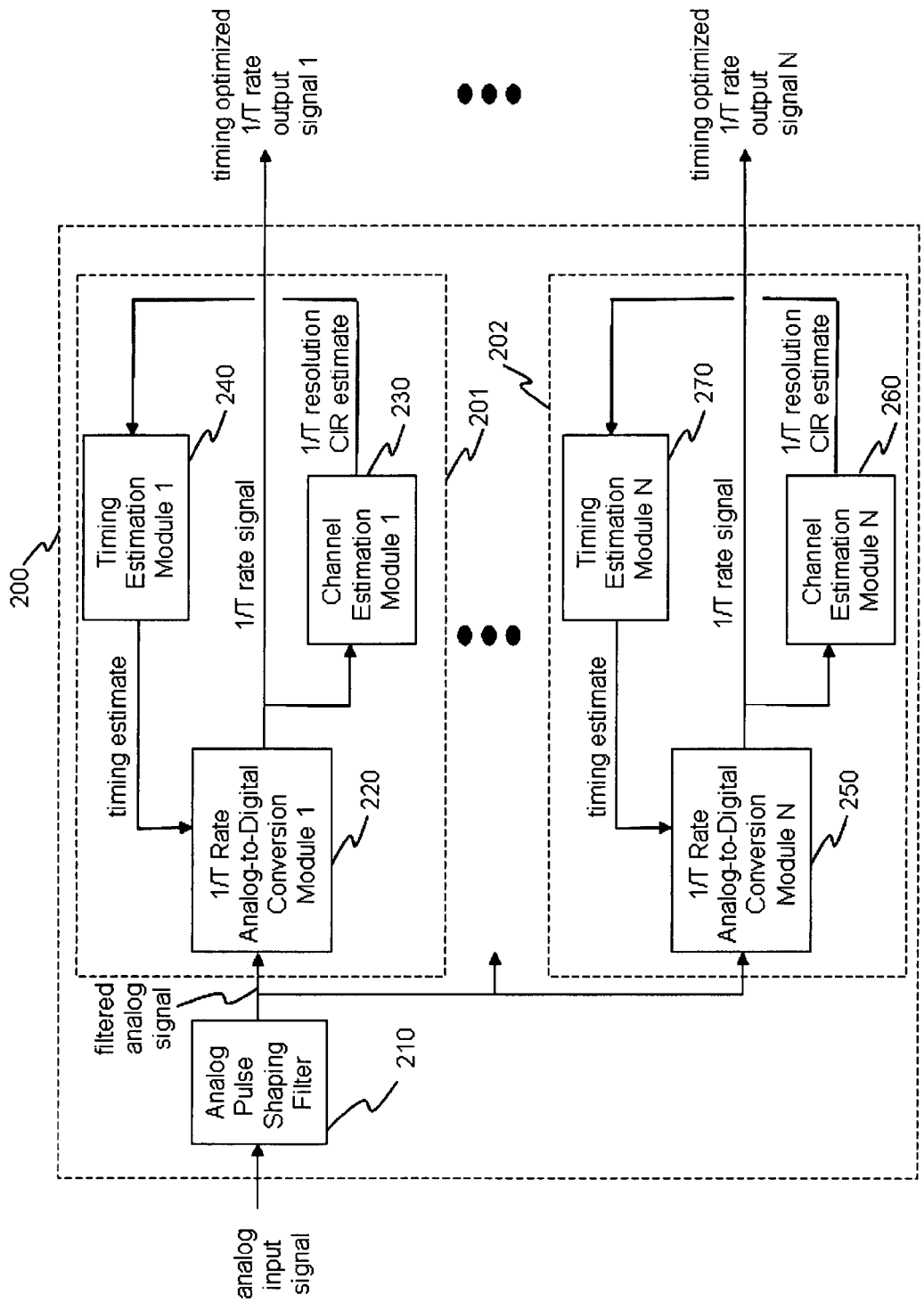
FIG. 2 depicts a second block diagram of a channel estimate based timing recovery system in accordance to an embodiment of the present invention.

FIG. 2 illustrates a minimum sample rate, channel estimate based timing recovery system 200 that is implemented for multiple signals using similar processing modules as in FIG. 1. The filtered analog signal that is output from the analog pulse shaping filter 210 is received by multiple signal timing recovery subsystems numbered as 1 to N, with only the $1^{st}$ and $N^{th}$ timing recovery subsystems, 201 and 202 being shown explicitly in FIG. 2.

An example application for the type of multiple signal implementation shown in FIG. 2 is a single antenna interference canceller baseband receiver in which multiple interfering radio signals are jointly present in and processed from an input analog signal obtained from a single antenna. The ability of the present invention to provide timing recovery for multiple signals and/or dispersive channels (e.g., wireless channels that distort the received signal) is of significant importance since each of these requirements are known to be difficult to fulfill.

Figure 3:
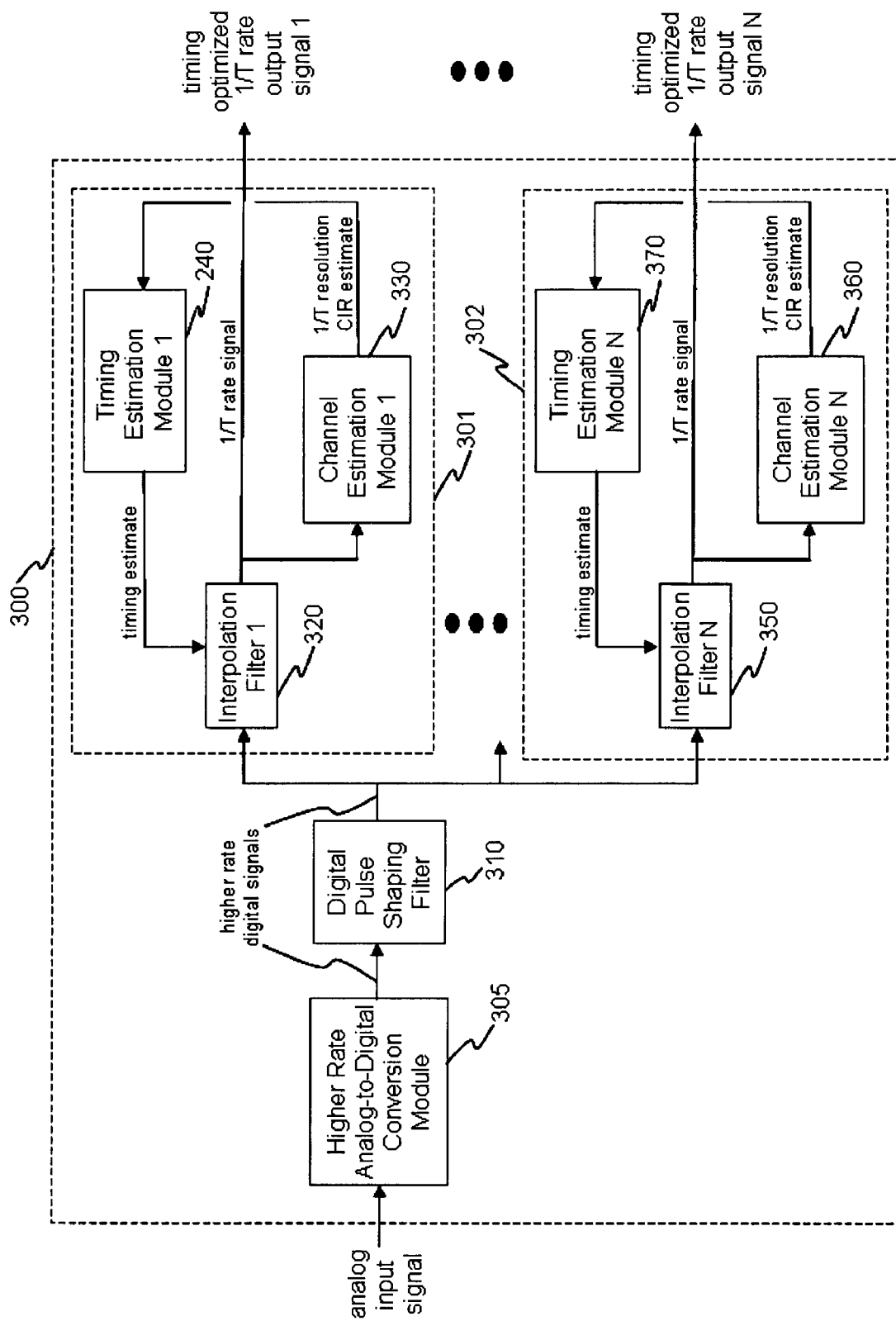
FIG. 3 depicts a third block diagram of a channel estimate based timing recovery system in accordance to an embodiment of the present invention.

FIG. 3 illustrates an alternative implementation of the minimum sample rate, channel estimate based timing recovery system 300 for multiple signals. In the implementation of FIG. 3, the input analog signal is received by a higher rate analog-to-digital conversion module 305 that outputs a higher rate digital signal that is received by a digital pulse shaping filter 310. The term 'higher rate' refers to sample rates equal to or greater than 2/T, i.e., at least two samples per fundamental timing interval T.

The digital pulse shaping filter 310 provides the higher rate digital signal that is received by multiple signal timing recovery subsystems numbered as 1 to N, with only the $1^{st}$ and $N^{th}$ signal timing recovery subsystems, 301 and 302, being shown explicitly. The interpolation filters 320 and 350 receive in common the higher rate digital signal that is output from the digital pulse shaping filter 310 and receive separately the local timing estimates that are output from the timing estimation modules 240 and 370, respectively. The timing estimation modules 240 and 370 receive the 1/T resolution CIR estimates from the channel estimation modules 330 and 360 which in turn receive the 1/T rate signal from the interpolation filters 320 and 350, respectively.

Comparing the implementations of FIGS. 2 and 3, the implementation of FIG. 2 has N functionally separate 1/T rate analog-to-digital conversion modules, one analog filter and no digital filters whereas the implementation of FIG. 3 has one M/T rate analog-to-digital conversion module (M≧2) and 2*N+1 digital filters where N is the number of multiple signals being processed from the single analog input signal.

Figure 4:
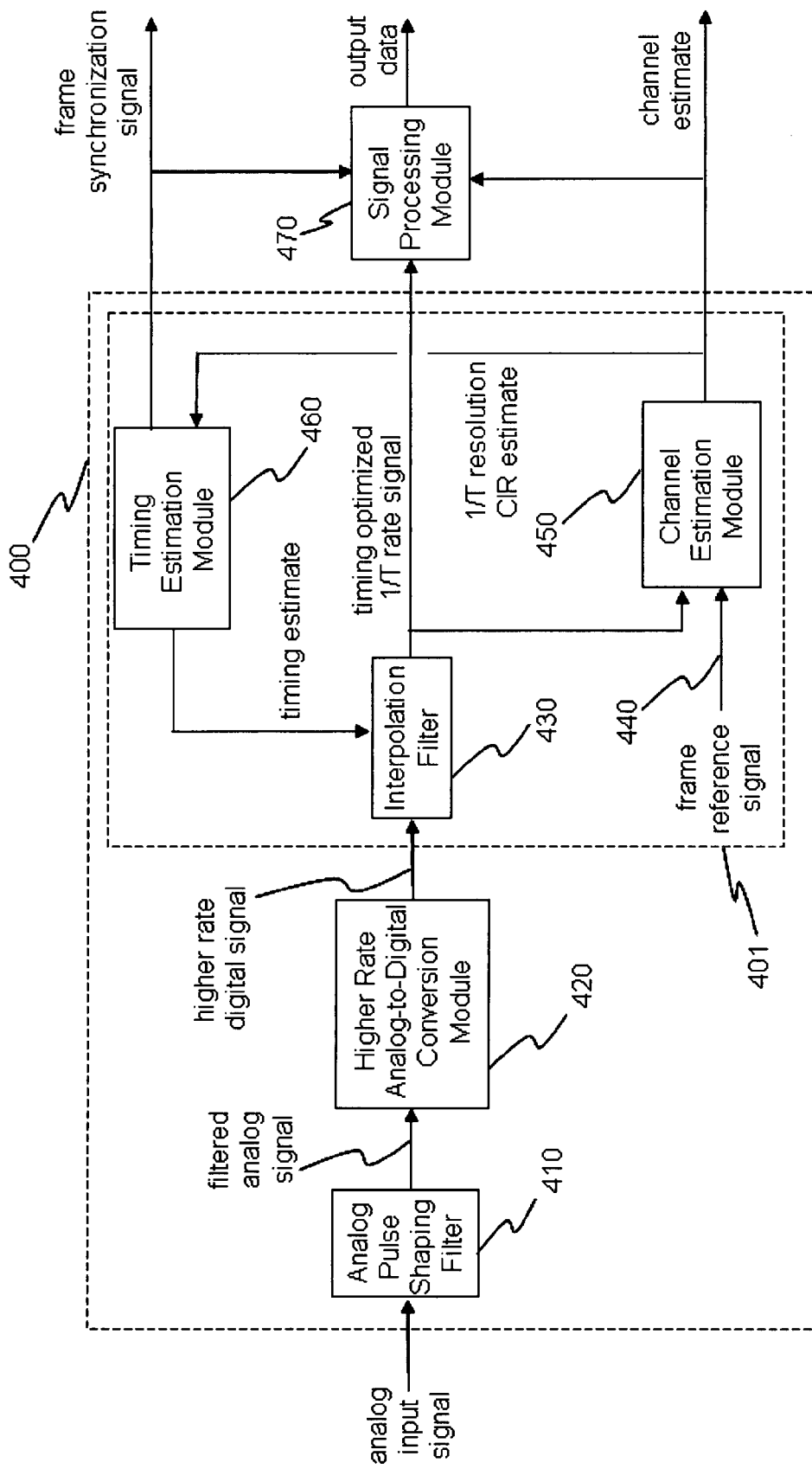
FIG. 4 depicts a fourth block diagram of a channel estimate based timing recovery system in accordance to an embodiment of the present invention.

FIG. 4 illustrates another alternative implementation of the minimum sample rate, channel estimate based timing recovery system 400, which is presented for a single signal timing recovery application. Comparing the implementation of FIG. 4 to that of FIG. 3, an analog pulse shaping filter 410 receives the analog input signal and provides a filtered analog signal to the higher rate (M/T rate, M≧2) analog-to-digital conversion module 420, eliminating the need for the digital pulse shaping filter 310. The implementation in FIG. 4 can be extended to multiple (N) signal timing recovery applications by replicating the timing recovery subsystem 401 so as to provide N such subsystems as was done previously in FIGS. 2 and 3. Other implementations of the minimum sample rate, channel estimate based timing recovery system can be considered by one trained in the art.

FIG. 4 also illustrates that the motivation for generating a timing optimized 1/T rate signal is to output this signal to a signal processing module 410 that is application specific. For example, returning to the WCDMA user device application, the signal processing module can represent a process that inputs the timing optimized 1/T rate signal and outputs raw symbol estimates to the decoder units that are described in the appropriate 3GPP specification for WCDMA. In this example and others, the signal processing module can take advantage of the availability of the 1/T resolution CIR estimate generated by the channel estimation module 450.

Furthermore, if the channel estimation module 450 uses a signal frame based reference signal 440 to estimate the channel as discussed below, then the timing estimation module 460 can provide a frame synchronization signal that can be used to advantage by the signal processing module 410. Considering the WCDMA downlink receiver application example, it is known that the CPICH pilot is intended for channel estimation. In this example, the known base station scramble code can be used as the frame reference signal 440 allowing the timing estimation module 460 to provide a frame synchronization signal marking the 256 chip sub-frame of the WCDMA signal.

Figure 5:
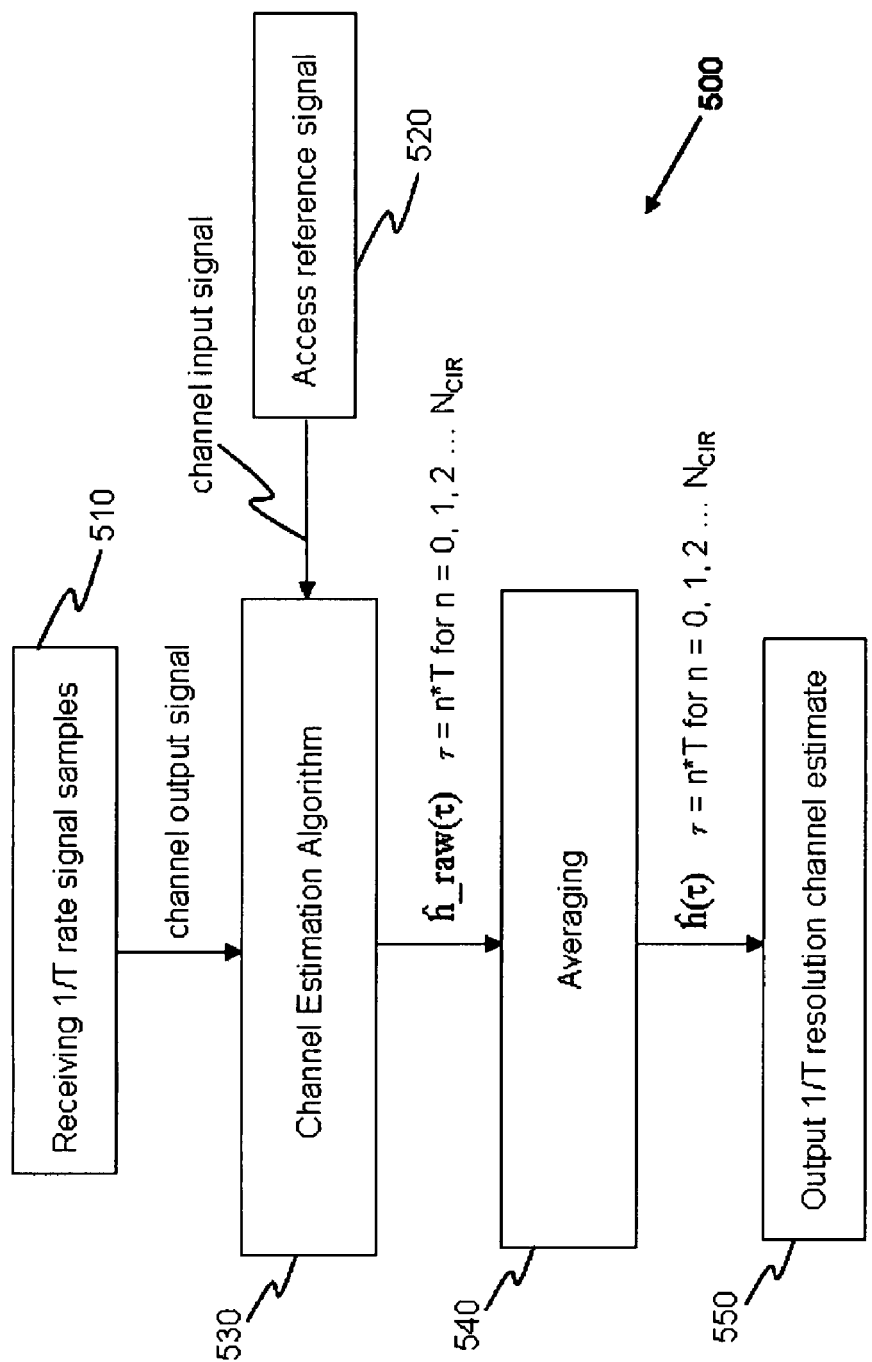
FIG. 5 depicts a flow chart for outputting a 1/T resolution channel estimate in accordance to an embodiment of the present invention.

FIG. 5 illustrates certain functions performed by the channel estimation module 500. In block 510 the 1/T rate sampled signal that represents the channel output is received from, for example, either a 1/T rate analog-to-digital conversion module or a 1/T rate digital interpolation filter. A known reference signal is also accessed in block 520 that represents the channel input. The known reference signal and the 1/T rate sampled signal can be processed by a number of data aided channel estimation procedures or other known channel estimation procedures which may be applied in block 530. The output of the channel estimation algorithm is a raw channel estimate waveform that is a set of complex (or real) numbers that can be notated as, $\hat{h}\_raw(\tau)$, at discrete time lags $\tau=n*T$ for n=0, 1, 2 ... $N_{CIR}$.

Referring to FIG. 5, the averaging block 540 receives a sequence of the raw channel estimate waveforms from the channel estimation algorithm 530 and performs an averaging to improve the quality of the channel estimate. Block 550 outputs the averaged channel estimate as a 1/T resolution waveform that can be notated as a set of complex (or real) numbers, $\hat{h}(\tau)$, at discrete time lags $\tau=n*T$ for n=0, 1, 2 ... $N_{CIR}$.

Note that the presence of the pulse shaping filter in the channel has the consequence that the 1/T resolution channel estimate waveform, $\hat{h}(\tau)$ at discrete $\tau=n*T$ for n=0, 1, 2 ... $N_{CIR}$, is effectively a sampling of the channel impulse response and contains the timing phase information for the reference signal used in the channel estimation module. For example, in the WCDMA baseband receiver application, the transmitter-to-receiver channel $h(\tau)$ is the convolution of the RF propagation channel and a low pass filter of cutoff frequency 1/(2*T). In this example the 1/T resolution channel estimate can be obtained using the CPICH pilot as a reference signal. The resulting 1/T resolution channel estimate contains the timing phase information that allows a precision estimate of the timing of the CPICH pilot in the 1/T sample rate signal of interest (e.g., the 1/T sample rate signal in FIGS. 1 to 4).

It is novel to think of a 1/T sample rate signal as containing timing phase information for a digital communications signal with fundamental timing interval T. It is generally thought that a sample rate of at least a 2/T is required to recover the timing phase of the fundamental timing interval T. Once it is realized that the detailed timing information for the reference signal used to compute the channel estimate is contained in the 1/T resolution channel estimate, methods can be defined for estimating the timing. FIGS. 6, 7, 8 and 9 illustrate methods for obtaining the timing estimate from a 1/T resolution channel estimate.

Figure 6:
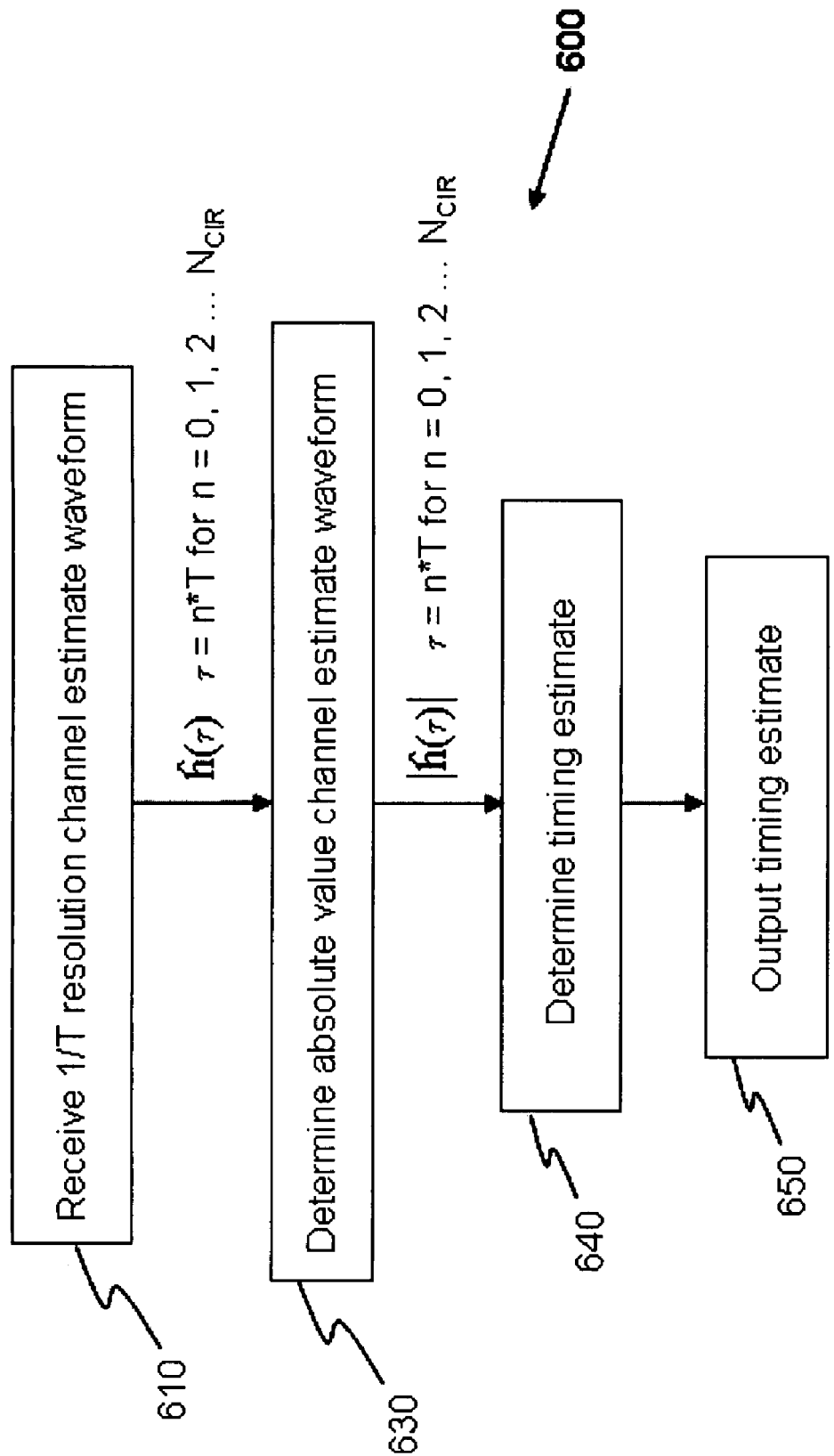
FIG. 6 depicts a first flow chart for obtaining a timing estimate from a 1/T resolution channel estimate in accordance to an embodiment of the present invention.

FIG. 6 illustrates processes in the timing estimation module 600. The 1/T resolution channel estimate waveform, $\hat{h}(\tau)$, is received 610 and an absolute value channel estimate waveform, $|\hat{h}(\tau)|$, is determined 630, such that $|\hat{h}(\tau)| = \{real(\hat{h}(\tau))^2 + imag(\hat{h}(\tau))^2\}^{1/2}$ where real( ) and imag( ) provide the real and the imaginary parts of the possibly complex valued $\hat{h}(\tau)$. Approximate methods can be used for determining the magnitude waveform, $|\hat{h}(\tau)|$. An example is: $|\hat{h}(\tau)| \cong A^*max(I,Q) + B^*min(I,Q)$ where $I=real(\hat{h}(\tau))$, $Q=imag(\hat{h}(\tau))$, where $A=0.9605$ and $B=0.3979$. Block 640 in FIG. 6 determines the timing estimate from the absolute value channel estimate waveform, $|\hat{h}(\tau)|$, using methods described below and illustrated in FIGS. 7, 8 and 9.

Figure 7:
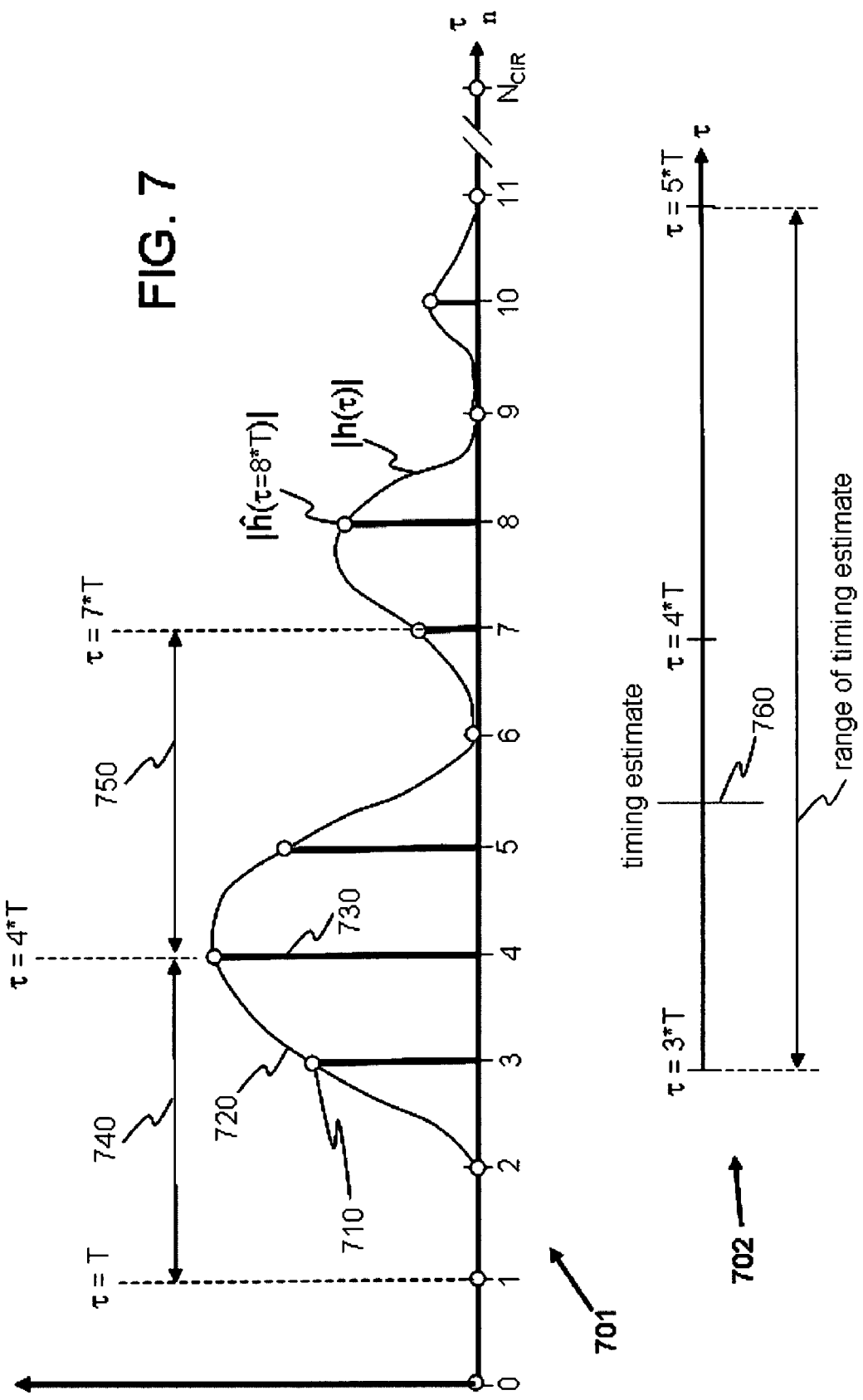
FIG. 7 depicts a second flow chart for obtaining a timing estimate from a 1/T resolution channel estimate in accordance to an embodiment of the present invention.

Referring to FIG. 7, the plot 701 is a representation of both the estimated $|\hat{h}(\tau=n^*T)|$ and the actual $|h(\tau)|$ versus r. The estimate $|\hat{h}(\tau=n^*T)|$ is available at discrete time lags $\tau=n^*T$ for $n=0, 1, 2 \ldots N_{CIR}$. For example, 710 represents the value of $|\hat{h}(\tau=n^*T)|$ at $n=3$. The actual, but unknown $|h(\tau)|$ is shown as a continuous curve 720 for continuous $\tau$. Due to the presence of the pulse shaping filter, curve 720 is known to be a well behaved, slowly changing smooth curve for all $\tau$ between the $\tau=n^*T$ measurement points.

Figure 8:
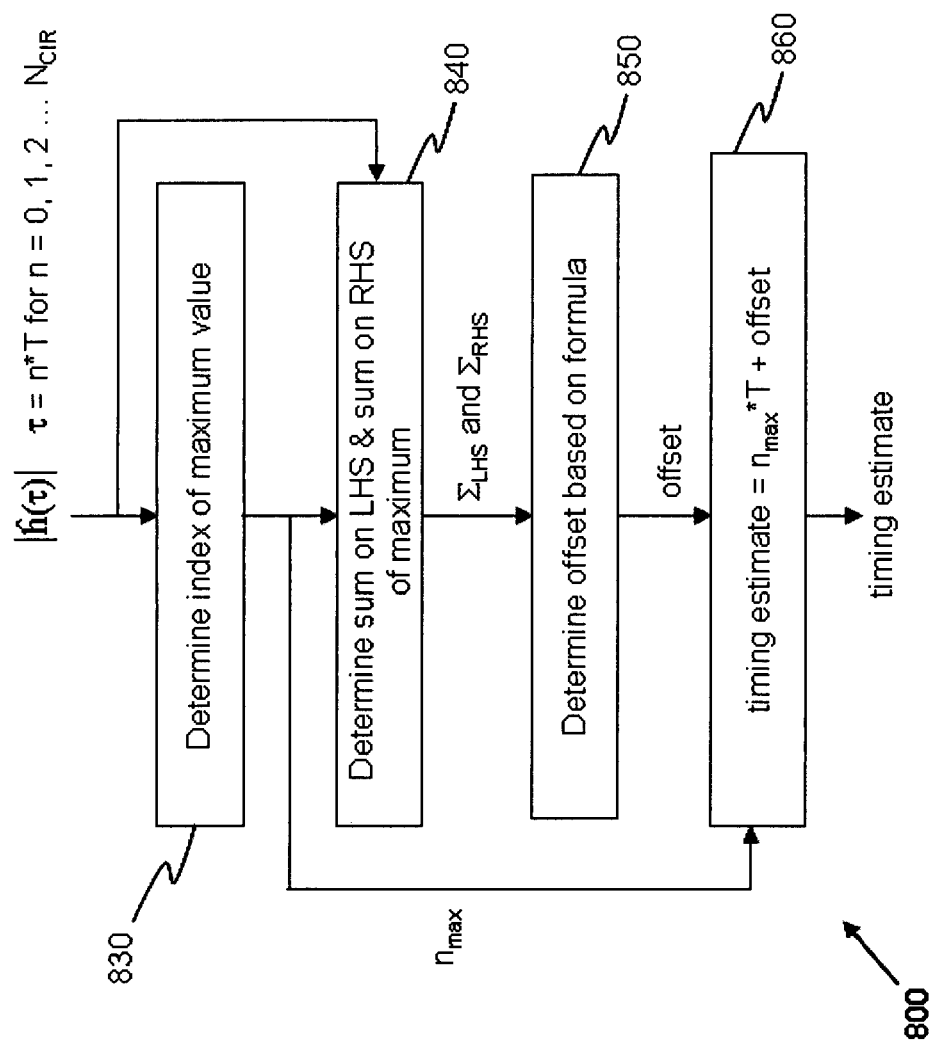
FIG. 8 depicts a third flow chart for obtaining a timing estimate from a 1/T resolution channel estimate in accordance to an embodiment of the present invention.

Referring to FIG. 8, a suitable method of determining the timing estimate 800 involves first finding the maximum of $|\hat{h}(\tau=n^*T)|$ 830 and then determining a sum from $|\hat{h}(\tau=n^*T)|$ data on the left hand (LHS) side of the maximum and a sum from $|\hat{h}(\tau=n^*T)|$ data on the right hand side (RHS) of the maximum 840. As illustrated in 701 of FIG. 7, the maximum of $|\hat{h}(\tau=n^*T)|$ occurs at $n_{max}=4$ notated as 730 and we define a 3*T length range 740 for determining $\Sigma_{LHS}$=the LHS sum of $|\hat{h}(\tau=n^*T)|$ data and a 3*T length range 750 for determining $\Sigma_{RHS}$=the RHS sum of $|\hat{h}(\tau=n^*T)|$ data. An offset is then determined 840 from a formula that inputs $\Sigma_{LHS}$ and $\Sigma_{RHS}$. An example of a suitable formula is:

$$offset = A^*(\Sigma_{RHS} - \Sigma_{LHS})^*T$$

$$offset = max([-T, min([+T, offset])])$$

where A is a positive constant; max( ) and min( ) pick the maximum and minimum, respectively. The latter expression bounds the offset to +/−T. As illustrated in 702 of FIG. 7, this restricts the timing estimate 760 to be within +/−T of the location of maximum. This restriction tends to maximize the energy available for subsequent processing of the timing optimized 1/T rate signal. The timing estimate is then determined in block 850 as timing estimate=$n_{max}$*T+offset. Other ranges for the LHS and RHS sums can be used and other more complicated formulas for the offset can be used within the same design 800 for determining the timing estimate shown in FIG. 8. The LHS and RHS ranges and the parameters in the formulas can be found experimentally using least squared error techniques to improve the statistical agreement of the timing estimate data from the formulas with timing estimate data obtained from alternative known timing recovery procedures.

Figure 9:
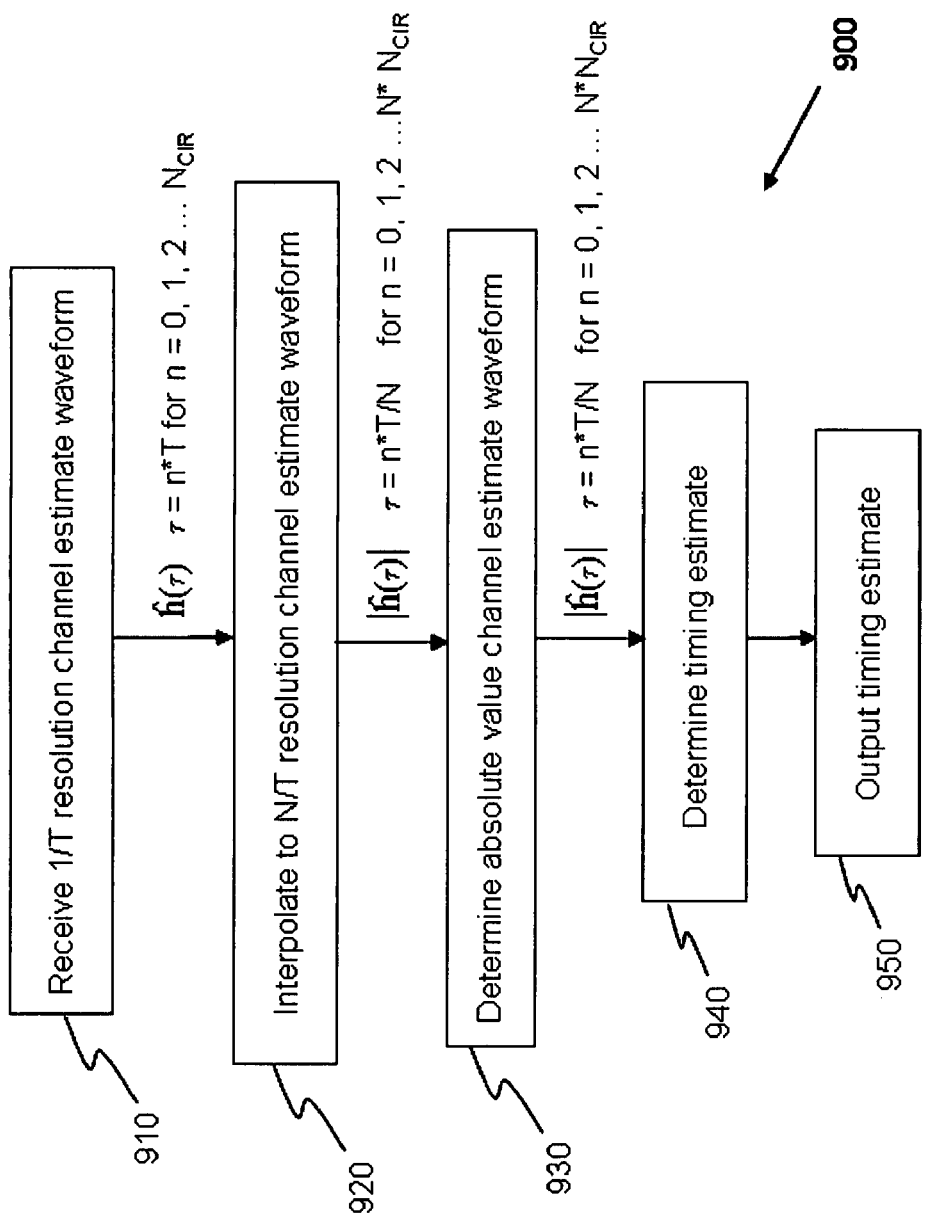
FIG. 9 depicts a fourth flow chart for obtaining a timing estimate from a 1/T resolution channel estimate in accordance to an embodiment of the present invention.

FIG. 9 illustrates processes an alternative implementation of the timing estimation module 900. The 1/T resolution channel estimate waveform, $\hat{h}(\tau)$, is received 910 and an interpolation is performed 920 in order to create a higher resolution channel estimate waveform that is defined at N time lags in each time lag interval T where $N \geq 2$. This N/T resolution, interpolated channel estimate waveform, $\hat{h}\_i(\tau=m^*T/N)$ for $m=0, 1, 2 \ldots N^*N_{CIR}$, has the property that when $m=0, N, 2^*N, \ldots N_{CIR}^*N$ it is equal to the original 1/T channel estimate waveform $\hat{h}(\tau=n^*T)$ $n=0, 1, 2 \ldots N_{CIR}$ that is a 1/T resolution estimate of the actual channel impulse response, $h(\tau)$ at each $\tau=n^*T$. Given the presence of the pulse shaping filter in the channel and provided a conservative interpolation technique is applied, at other values of m, the higher resolution $\hat{h}\_i(\tau=m^*T/N)$ is also a reasonable approximation to the actual channel impulse response, $h(\tau)$ at each $\tau=m^*T/N$. This provides that any known method for determining the timing estimate from a higher (i.e., N/T with $N \geq 2$) resolution channel estimate can be applied to the $\hat{h}\_i(\tau=m^*T/N)$ waveform. For example the absolute value channel estimate waveform $|\hat{h}\_i(\tau=m^*T/N)|$, for $m=0, 1, 2 \ldots N^*N_{CIR}$, can be determined 920 and the method of finding the value of $m=m_Y$ that maximizes a signal-to-interference-plus-noise ratio (SINR) formula defined as:

$$Y = |\hat{h}\_i(m^*T/N)|^2 / (\Sigma|\hat{h}\_i(n^*T/N)|^2 + 2^*N_O)$$

where the summation ($\Sigma$) is $n=m-K^*N, m-(K-1)^*N, \ldots m-N$. Note that the timing estimation method utilizing this formula requires over-sampling at a rate of N samples per fundamental timing interval T to produce a higher (i.e., N/T with $N \geq 2$) resolution channel estimate whereas the methods and systems of the present invention provide a timing estimate given the minimal 1/T sample rate. According to the present invention the above formula and other ad-hoc formulas can be used to determine timing estimates from the interpolated channel impulse response estimate that is derived from a minimally sampled 1/T rate digital signal as explained herein.

Although embodiments of the present invention have been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the channel estimation can be performed via hardware and/or software using a processor such as a Reduced Instruction Set Computer (RISC) or a Digital Signal Processor (DSP). Further, although depicted in a particular manner, more than one of the modules can be utilized in the present invention and functionality provided by one module can be fully and/or partially provided by another one of the modules. Also, the transfer of information from one module to another module can be performed by a wired or a wireless connection.

What is claimed is:

1. A module, comprising:
   a timing estimation module;
   a channel estimation module communicably coupled to the timing estimation module;
   a conversion module communicably coupled to the timing estimation module and to the channel estimation module; and
   an analog pulse shaping filter communicably coupled to the conversion module;

wherein:
the analog pulse shaping filter receives an analog signal and outputs a filtered analog signal;
the conversion module receives the filtered analog signal and outputs a 1/T rate signal to the channel estimation module;
the channel estimation module outputs a 1/T Channel Impulse Response (CIR) estimate to the timing estimation module; and
the timing estimation module outputs a timing estimate to the conversion module, wherein the timing estimate is used in conjunction with an output of the conversion module to provide the 1/T rate signal.

2. The module of claim 1, wherein the output of the conversion module is a digital signal.

3. The module of claim 1, wherein the conversion module is a higher rate analog-to-digital conversion module.

4. The module of claim 1, wherein the 1/T rate signal is at least one of:
a timing optimized output signal; and
a minimum rate signal.

5. The module of claim 1, wherein the 1/T rate signal is sent to a user associated with the module.

6. A module, comprising:
an interpolation filter;
a timing estimation module communicably coupled to the interpolation filter; and
a channel estimation module communicably coupled to the interpolation filter, and to the timing estimation module;
wherein:
the interpolation filter receives a digital signal and outputs a 1/T rate signal to the channel estimation module;
the channel estimation module outputs a 1/T Channel Impulse Response (CIR) estimate to the timing estimation module; and
the timing estimation module outputs a timing estimate to the interpolation filter, wherein the timing estimate is used in conjunction with the digital signal to provide the 1/T rate signal.

7. The module of claim 6 comprising a conversion module communicably coupled to the interpolation filter.

8. The module of claim 7 wherein the conversion module is a higher rate analog-to-digital module.

9. The module of claim 7 wherein the conversion module receives an analog signal.

10. The module of claim 6, wherein the 1/T rate signal is at least one of:
a timing optimized output signal; and
a minimum rate signal.

11. A module, comprising:
an interpolation filter;
a module communicably coupled to the interpolation filter;
a timing estimation module communicably coupled to the interpolation filter; and
a channel estimation module communicably coupled to the module, to the interpolation filter, and to the timing estimation module;
wherein:
the interpolation filter receives a digital signal and outputs a one sample per baud interval (1/T) rate signal to the module and to the channel estimation module;
the channel estimation module outputs a Channel Impulse Response (CIR) estimate to the timing estimation module; and
the timing estimation module outputs a timing estimate to the interpolation filter.

12. The module of claim 11, wherein the module is at least one of:
a signal processing module;
a demodulator module.

13. The module of claim 12 wherein the demodulator module outputs data.

14. The module of claim 13 wherein the output data is received by a user.

15. The module of claim 14 wherein the user is associated with the module.

16. A method for determining a timing estimate, comprising:
receiving, via a receiver, a 1/T sampled channel waveform estimate;
interpolating, via an interpolating filter, the 1/T sampled channel waveform estimate to an N/T sampled channel waveform estimate;
determining an absolute value waveform based on the interpolating; and
determining a timing estimate, via a timing estimation module, based on the absolute value waveform.

17. The method of claim 16 comprising outputting the timing estimate to at least one of:
a conversion module;
the timing estimation module;
another timing estimation module;
a timing error detector; and
a timing recovery module.

18. The method of claim 16, wherein N is greater than 1.

19. The method of claim 16, wherein N is around 8 to around 64.

20. The method of claim 16, wherein the 1/T sampled channel waveform estimate is based upon an analog pulse shaped filtered signal.

* * * * *